Sept. 27, 1966 L. S. WOODS ETAL 3,274,973
CONFINEMENT FEED METHOD AND APPARATUS THEREFOR
Filed June 9, 1964 2 Sheets-Sheet 1

INVENTORS.
LOUIS S. WOODS
VIRGIL W. MORRIS
BY *Shanley & O'Neil*
ATTORNEYS.

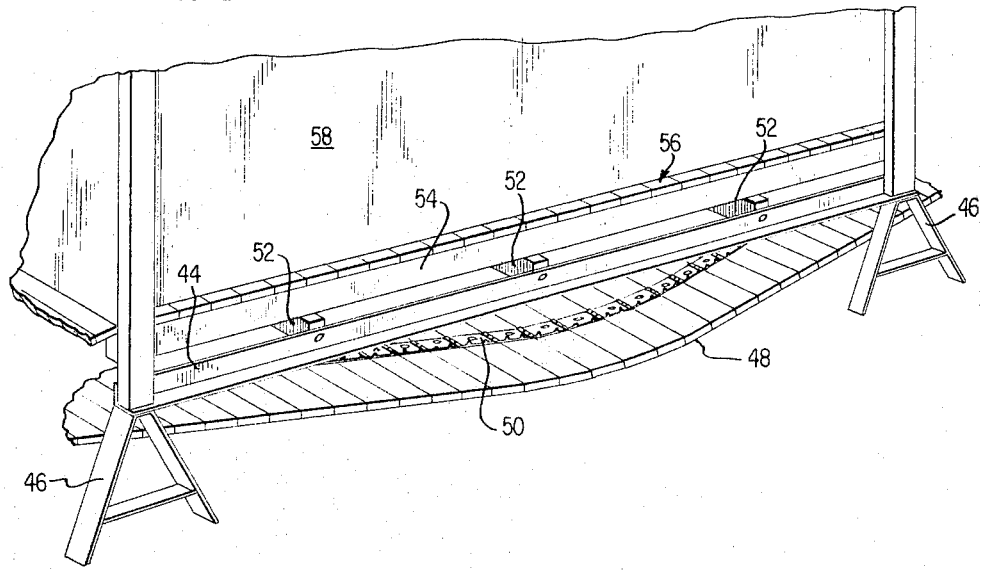
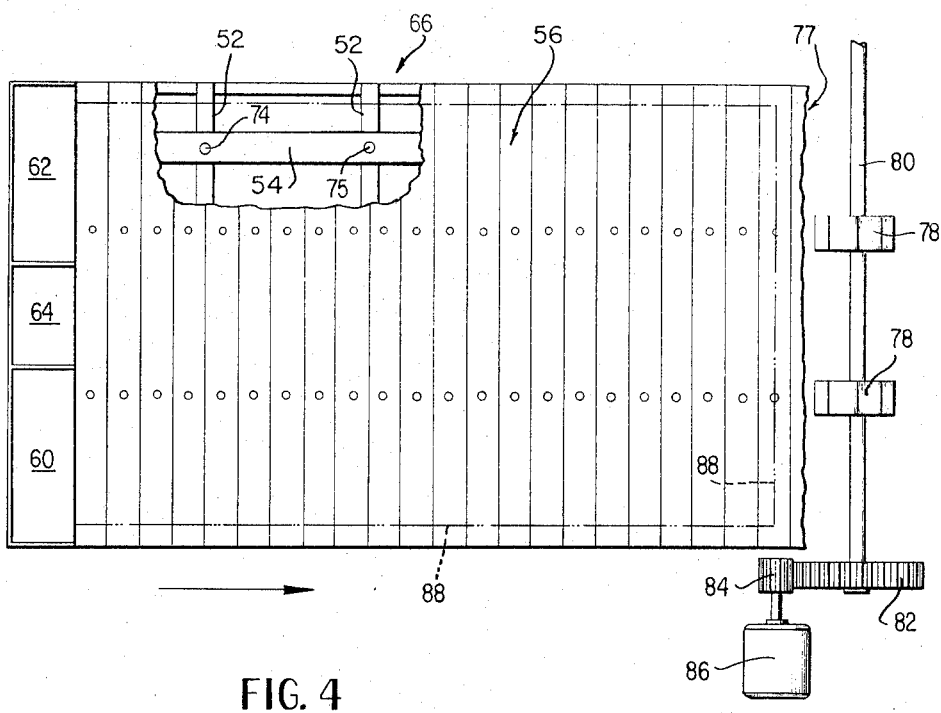

United States Patent Office 3,274,973
Patented Sept. 27, 1966

3,274,973
CONFINEMENT FEED METHOD AND
APPARATUS THEREFOR
Louis S. Woods, Rte. 1, Adrian, Mo., and Virgil W.
Morris, Rte. 1, Butler, Mo.
Filed June 9, 1964, Ser. No. 373,784
11 Claims. (Cl. 119—51.11)

This invention is concerned with an optimum environment for confinement feeding of animals and includes novel floor structure and improved feeding methods for use in confinement feeding.

Large-scale operations in confinement feeding of animals have in general generated large-scale health hazards to animals. The result has been a decreasing rather than an increasing percentage yield from such operations when compared to smaller or open-farm operations. A primary objective of this invention is provision of a confinement feeding environment which substantially eliminates health hazards, greatly increases the percentage yield from feeds, eliminates manual handling of waste material, and facilitates keeping of production statistics.

In describing the invention reference will be had to the accompanying drawings wherein:

FIGURE 3 is a partial perspective view of structure embodying the invention, and FIGURE 4 is a partial plan view, with portions cut away, of the embodiment of the FIGURE 3.

Figure 1:
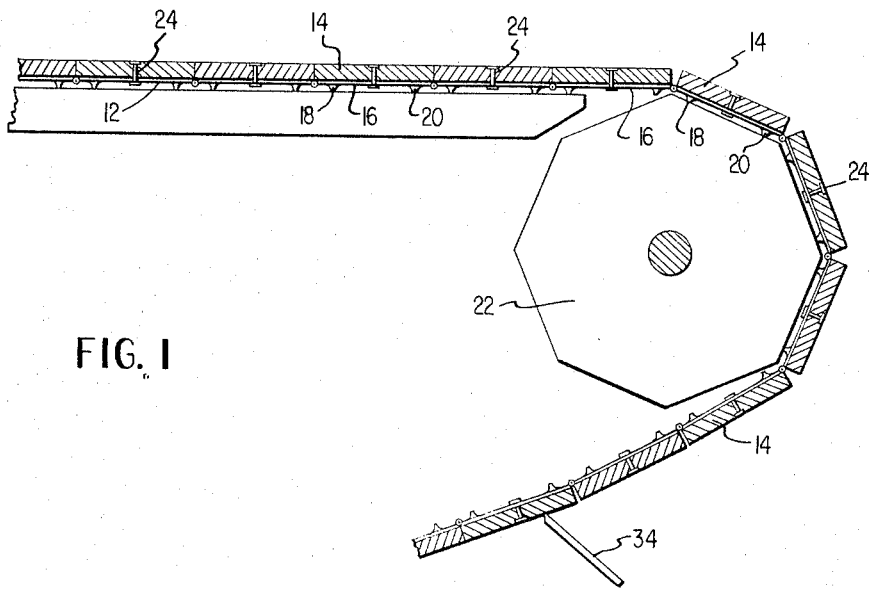
FIGURE 1 is a partial showing of flooring embodying the invention.

FIGURE 1 shows portions of a novel floor structure included in the invention. This floor provides solid support for animals while making provision for drainage of liquid waste matter and for separate accumulation of solid waste matter. As will be discussed in detail later, clean flooring is periodically provided to confined animals and healthful conditions are readily maintained.

The flooring structure includes a continuous linkage means 12 carrying a plurality of individual floor boards 14. The floor boards 14 are substantially identical and each is supported on an individual link 16 having cog ribs 18 and 20. Cog ribs 18 and 20 contact cog wheel 22 which provides for movement of the flooring. Individual floor boards 14 are held to individual link means 16 by a centrally located fastener 24. It should be noted that with the individual floor boards 14 and links 16, longitudinal side edges of floor boards 14 come into close contact when traveling in a horizontal path and are separated when traveling around cog wheel 22.

Figure 2:
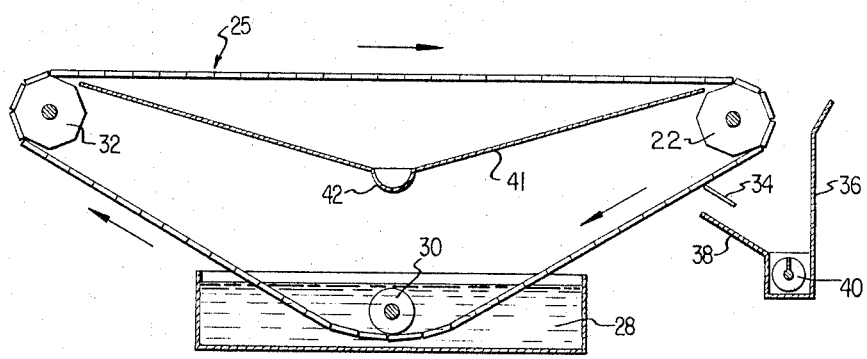
FIGURE 2 is a schematic diagram of structure embodying the invention including the flooring of FIGURE 1.

FIGURE 2 is a schematic drawing showing other aspects of the invention. In this schematic, the continuous flooring 25, such as that shown in FIGURE 1, moves in the direction shown around cog wheel 22 toward disinfectant bath 28. Continuous flooring 25 is submerged in bath 28 by passage around sink roll 30. Thereafter flooring 25 returns to the horizontal work path by way of cog wheel 32.

In passing from cog wheel 22 to sink roll 30, solid matter is scraped from flooring 25 by scraper 34 and any loose matter is caught by baffles 36 and 38 which direct solid waste matter to auger 40.

Liquid waste matter drains through the flooring 25 and is gathered by drain pan 41 and accumulated through spout 42 in tank means (not shown).

Referring to FIGURE 1, the scraper blade 34 is shown in a suitable location for scraping individual floor boards 14. It is desirable to have the scraper 34 contact the floor boards after they are free of cog wheel 22. The angle of contact should be slightly removed from perpendicular as shown. The scraper 34 should partially support the weight of the individual floor board 14 and link 16 at this point.

A perspective view of a portion of the confinement environment of the present invention when used for feeding employing continuous flooring as described above is shown in FIGURE 3; disinfectant means, such as bath 28, and liquid waste drainage means, such as drain pan 41 are omitted from this figure for better visibility of other parts of the invention. Angle irons 44 are supported on stands 46. A portion of the continuous flooring at 48 is in its return path beneath the animal confinement structure with continuous linkage means 50 located internally. A plurality of such continuous linkage means are ordinarily used, with the number being dependent upon the longitudinal length of individual floor boards.

Cross ties such as 52 extend between angle irons 44. Runners 54 are carried by the cross ties 52; the number of runners used is dependent upon the longitudinal length of individual floor boards. The runners 54 support articulated flooring 56 when in its horizontal work path. They also provide clearance between cross ties 52 and continuous linkage 50.

Pen means 58 may be of any suitable construction.

FIGURE 4 is a top plan view with portions of the novel flooring cut away for purposes of illustration and explanation; disinfectant means, such as bath 28, and liquid waste drainage means, such as drain pan 41, are omitted from this figure for better visibility of other parts of the structure. Feed troughs 60 and 62 and watering means 64, which are shown schematically and can be automatic conventional time operated feeding and watering devices, are located at the floor return end of the unit so that feed spilled from the troughs will fall onto clean flooring and be used by the animals. Water spillage will drain off with liquid waste matter. The advantage of these features will be obvious to those engaged in the art.

In the cut-away section 66 of FIGURE 4, the cross ties 52 are shown supporting runner 54 at intersections 74, 75.

At the end of the work path for flooring 56, part of the drive means for the flooring can be seen at cut-away section 77. Cogs 78, similar to cog 22 shown schematically in FIGURES 1 and 2 are shown connected to drive shaft 80. Drive shaft 80 may continue beyond a single unit and be used to move flooring on other units in coordination with the original one. Drive shaft 80 is connected to be driven by wheel 82 which is driven through gearing 84 by power source 86.

Pens or walls for a confinement unit may be any suitable type. They should be within the boundaries of the flooring structure, e.g. as shown in dot-dash lines at 88 in FIGURE 4.

The feeding and watering means may be of conventional design and are preferably automated with provisions for conventional timed feeding and watering.

In accordance with the invention, feed utilization and weight yield is increased by coordinating feeding with the changing of floor. It will be noted from FIGURE 2 that only approximately one-third of the floor is in use at any time. Periodically, at least a portion of the floor is moved and clean flooring is presented. In practice, the presentation of clean flooring to confined hogs has been coordinated with the time of feeding. That is disturbing the animals, by movement of the floor, is coordinated with feeding. Usually the animals stand when the floor is moved and feed and water are presented at that time. With this feeding method, the food is used without waste and yield per pound of food has been increased considerably over prior art methods.

Other experience with hogs in confinement feeding show the adaptability of the unit for obtaining production statistics. A sow is placed into the unit when she is due to produce a litter. At weaning time, the sow is removed and the litter remains in the unit. The sow is bred and during the normal gestation period of 114 days, the litter will be raised. With this unit feeding times of hogs in preparation for market has been reduced approximately one-third. After the litter is shipped to the market, the sow is returned to the unit.

It should be noted that the complete cycle for raising a litter took place without a single change of environment for the litter. This is a distinct advantage since animals ordinarily lose several days' feeding time with each change in environment. With hogs, for example, about four changes of environment would ordinarily be necessary with the conventional apparatus. Note that the production records of a particular sow and growth of her animals can be kept accurately when using these confinement units.

Obviously modifications and variations of the present invention are possible in the light of the above teachings. It is therefore to be understood, that within the scope of the appended claims, the invention may be practiced otherwise than as specifically described.

What is claimed is:

1. Animal environment and articulated flooring which presents a substantially solid surface for animal support and provides for separate accumulation of liquid and solid waste matter comprising
   floor board means including a plurality of individual elongated floor boards having substantially rectilinear longitudinal side edge configuration,
   continuous conveyor means for the floor board means including continuous linkage means with individual links and means for securing individual floor boards to individual links to present a substantially solid surface for animal support when the continuous linkage means travels in a substantially horizontal plane,
   drive means for the continuous conveyor means including cog means for contacting the individual links to move the continuous linkage means out of a horizontal plane without disturbing the means for securing individual floor boards to the individual links, and
   drainage pan means between an upper work path of the continuous conveyor means and a lower return path of the continuous conveyor means, the drainage pan means being disposed to service substantially the entire upper work path of the continuous conveyor means.

2. The structure of claim 1 further including scraper means mounted to contact individual floor boards when contiguous with the cog means to scrape solid matter from individual floor boards.

3. The structure of claim 2 further including
   auger means located for removal of solid waste matter scraped from the floor board means, and
   baffle means located to direct solid waste matter to the auger means.

4. Environment for confinement raising of animals which presents a substantially solid surface for animals' support and provides for separate accumulation of liquid and solid animal waste matter comprising
   animal support flooring which includes a plurality of individual elongated floor boards having longitudinal side edge configurations permitting the floor boards to be arranged in contiguous side-by-side relationship throughout their longitudinal dimension,
   conveyor support means defining an upper horizontally disposed work path and a lower return path for the flooring,
   continuous conveyor means for carrying the floor boards in longitudinally contiguous side-by-side relationship to provide a substantially solid surface for animal support and for conveying solid animal waste matter during passage of the floorboards through the horizontally disposed work path,
   drainage means located between the horizontally disposed work path and the lower return path of the flooring, the drainage means being disposed to catch liquid animal waste passable between the floorboards during their travel through the horizontally disposed work path,
   stationary wall means defining an animal confinement area on the upper horizontally disposed work path of the flooring,
   drive means connected to the continuous conveyor means for moving the floorboards in a direction transverse to the longitudinal dimension of the elongated floorboards,
   means for removal of solid waste matter from the elongated floorboards, the means for removal of solid waste matter being located externally of the confinement area defined by the wall means, and
   means for disinfecting the elongated floorboards, the means for disinfecting elongated floorboards being located externally of the animal confinement area defined by the wall means.

5. The environment for confinement raising of animals of claim 4 further including feed supply means located within the confinement area defined by the wall means.

6. The environment for confinement raising of animals of claim 4 in which the means for disinfecting the elongated floorboards includes a disinfectant bath means including sink means for submerging the elongated floorboards in the disinfectant bath means during passage of the elongated floorboards through the lower return path.

7. The environment for confinement raising of animals of claim 4 in which the means for removal of solid waste matter includes scraper means for contacting each elongated floorboard while being moved in the return path.

8. Confinement feeding method for animals supported on movable flooring comprising
   confining animals on movable flooring within an area not accessible to basic food supply,
   providing basic feed within the area where the animals are confined at preselected time intervals,
   moving the flooring supporting the animals to disturb the animals at preselected time intervals, and
   coordinating the preselected time intervals for movement of the flooring and providing basic feed within the area where the animals are confined.

9. The method of claim 8 in which animal waste matter is removed from and clean flooring provided within the area where the animals are confined at the preselected time intervals for moving the flooring supporting the animals.

10. Method for confinement raising of animals employing a confinement environment including movable animal support flooring comprising the steps of
    confining animals on movable support flooring within an area not accessible to basic feed supply,
    providing basic feed within the area where the animals are confined, the feed being provided at preselected intervals of time,
    moving the floor means supporting the animals to disturb the animals at preselected intervals of time, and
    coordinating the preselected intervals for movement of the floor means with the preselected feeding intervals so that basic feed is provided at substantially the time the animal support flooring is moved.

11. The method of claim 10 in which animal waste matter is removed from and clean flooring is provided within the area where the animals are confined at the preselected times for moving the animal support flooring.

(References on following page)

References Cited by the Examiner

UNITED STATES PATENTS

| | | | |
|---|---|---|---|
| 227,150 | 5/1880 | Crawford | 119—28 |
| 736,360 | 8/1903 | Burgess | 119—29 |
| 1,186,444 | 6/1916 | Schuchardt | 119—16 |
| 2,092,440 | 9/1937 | Cain | 119—28 X |
| 2,604,874 | 7/1952 | Forbes et al. | 119—15 |
| 3,002,494 | 10/1961 | Murray | 119—48 |
| 3,026,845 | 3/1962 | Winter | 119—51.11 |
| 3,119,374 | 1/1964 | Ladner | 119—28 X |
| 3,137,270 | 6/1964 | Rigterink et al. | 119—16 |

SAMUEL KOREN, *Primary Examiner.*

ALDRICH F. MEDBERY, *Examiner.*